United States Patent
Lee et al.

(10) Patent No.: US 9,409,489 B2
(45) Date of Patent: Aug. 9, 2016

(54) AUTOMOTIVE INDUCTIVE CHARGER WITH INSERTABLE MAGNETIC CORE

(71) Applicant: Hyundai Motor Company, Seoul (KR)

(72) Inventors: Woo Young Lee, Chungcheongbuk-do (KR); Byeong Seob Song, Gyeonggi-do (KR); Dae Woo Lee, Gyeonggi-do (KR); Jin Young Yang, Gyeonggi-do (KR); Jong Pil Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 221 days.

(21) Appl. No.: 13/930,646

(22) Filed: Jun. 28, 2013

(65) Prior Publication Data

US 2014/0176059 A1    Jun. 26, 2014

(30) Foreign Application Priority Data

Dec. 26, 2012    (KR) .......................... 10-2012-0153679

(51) Int. Cl.
*B60L 11/18*    (2006.01)
*H01F 38/14*    (2006.01)
(Continued)

(52) U.S. Cl.
CPC ............. *B60L 11/182* (2013.01); *B60L 3/0023* (2013.01); *B60L 11/14* (2013.01); *B60L 11/1805* (2013.01); *B60L 11/1812* (2013.01); *B60L 11/1829* (2013.01); *B60L 11/1831* (2013.01); *B60L 11/1881* (2013.01); *H01F 38/14* (2013.01); *H02J 7/025* (2013.01); *H02J 17/00* (2013.01); *H02J 50/10* (2016.02); *H04B 5/0037* (2013.01);

(Continued)

(58) Field of Classification Search
CPC .......... H02J 7/025; H02J 50/00; H02J 50/10; H02J 50/12; H02J 17/00; H01F 38/14; Y02T 90/122; B60L 11/182; B60L 11/1831; H04B 5/00; H04B 5/0075; H04B 5/0093; H04B 5/0037
USPC ....................... 320/108, 103, 104; 439/38, 39
See application file for complete search history.

(56) References Cited

U.S. PATENT DOCUMENTS 3,637,986 A * 1/1972 Laing ............................ 219/519
3,686,599 A * 8/1972 Lee ................................. 336/96
(Continued)

FOREIGN PATENT DOCUMENTS

JP    10-106866    4/1998
JP    10112354    4/1998
(Continued)

OTHER PUBLICATIONS

"Synonyms for inlet," interglot.com, published Apr. 25, 2012, accessed Mar. 26, 2015, http://web.archive.org/web/20120425054215/http://www.interglot.com/dictionary/en/en/translate/inlet.*

(Continued)

*Primary Examiner* — Robert Grant
*Assistant Examiner* — John Trischler
(74) *Attorney, Agent, or Firm* — Mintz Levin Cohn Ferris Glovsky and Popeo, P.C.; Peter F. Corless

(57) ABSTRACT

A magnetic connector apparatus that charges an electric vehicle through contactless magnetic coupling. The magnetic connector apparatus includes an external charger, an inlet, and a magnetic connector. The inlet is connected to a rechargeable battery of the vehicle. The magnetic connector is connected to a power source of the external charger and is transferred to the vehicle to be inserted into the inlet.

10 Claims, 10 Drawing Sheets

(51) Int. Cl.
*H02J 17/00* (2006.01)
*H02J 7/00* (2006.01)
*H04B 5/00* (2006.01)
*H02J 7/02* (2016.01)
*B60L 3/00* (2006.01)
*B60L 11/14* (2006.01)

(52) U.S. Cl.
CPC ............ *H04B 5/0075* (2013.01); *H04B 5/0093* (2013.01); *B60L 2200/10* (2013.01); *B60L 2200/18* (2013.01); *B60L 2200/32* (2013.01); *B60L 2200/36* (2013.01); *B60L 2210/22* (2013.01); *B60L 2210/30* (2013.01); *B60L 2230/14* (2013.01); *H02J 50/00* (2016.02); *H02J 50/12* (2016.02); *Y02T 10/70* (2013.01); *Y02T 10/7077* (2013.01); *Y02T 10/7088* (2013.01); *Y02T 10/725* (2013.01); *Y02T 10/7241* (2013.01); *Y02T 90/122* (2013.01); *Y02T 90/127* (2013.01); *Y02T 90/14* (2013.01); *Y02T 90/34* (2013.01)

(56) References Cited

U.S. PATENT DOCUMENTS

| | | | | |
|---|---|---|---|---|
| 3,995,209 | A * | 11/1976 | Weston | 323/355 |
| 4,038,625 | A * | 7/1977 | Tompkins et al. | 336/83 |
| 4,300,452 | A * | 11/1981 | Beuchat et al. | 102/270 |
| 4,500,881 | A * | 2/1985 | Beane | 340/13.26 |
| 4,893,105 | A * | 1/1990 | Maeda et al. | 336/84 M |
| 5,174,057 | A * | 12/1992 | Sienel | 43/5 |
| 5,264,776 | A * | 11/1993 | Hulsey | B60L 3/0069 320/108 |
| 5,341,280 | A * | 8/1994 | Divan | H01F 38/14 320/109 |
| 5,379,021 | A * | 1/1995 | Ito et al. | 336/83 |
| 5,408,209 | A * | 4/1995 | Tanzer et al. | 336/60 |
| 5,425,160 | A * | 6/1995 | Krapf | 24/67 R |
| 5,460,373 | A * | 10/1995 | McNutt | 463/47.2 |
| 5,461,299 | A * | 10/1995 | Bruni | 320/108 |
| 5,661,391 | A * | 8/1997 | Ito et al. | 320/108 |
| 5,681,284 | A * | 10/1997 | Herskowitz | 604/141 |
| 5,794,603 | A * | 8/1998 | Miyamoto | 123/634 |
| 5,852,394 | A * | 12/1998 | Watanabe et al. | 336/66 |
| 5,909,100 | A * | 6/1999 | Watanabe et al. | 320/108 |
| 6,127,800 | A * | 10/2000 | Kuki | B60L 11/182 320/108 |
| 6,188,304 | B1 * | 2/2001 | Skinner et al. | 336/107 |
| 6,736,646 | B2 * | 5/2004 | Takahashi et al. | 439/39 |
| 7,066,739 | B2 * | 6/2006 | McLeish | 439/39 |
| 7,311,526 | B2 * | 12/2007 | Rohrbach et al. | 439/39 |
| 7,331,793 | B2 * | 2/2008 | Hernandez et al. | 439/38 |
| 8,755,851 | B2 * | 6/2014 | Kim et al. | 455/575.1 |
| 2002/0049372 | A1 * | 4/2002 | Diab | 600/322 |
| 2004/0152535 | A1 * | 8/2004 | Thompson | 473/257 |
| 2008/0122149 | A1 * | 5/2008 | Kegeris | 269/8 |
| 2009/0072782 | A1 * | 3/2009 | Randall | 320/107 |
| 2010/0136801 | A1 * | 6/2010 | Limpkin et al. | 439/39 |
| 2012/0026724 | A1 * | 2/2012 | Metcalf et al. | 362/127 |
| 2013/0157477 | A1 * | 6/2013 | McCormack | 439/39 |
| 2014/0160820 | A1 * | 6/2014 | McKinley | 363/126 |

FOREIGN PATENT DOCUMENTS

| | | |
|---|---|---|
| JP | 10-308257 | 11/1998 |
| JP | 10309041 A * | 11/1998 |
| JP | 11041712 A * | 2/1999 |
| JP | 2012039831 A * | 2/2012 |
| KR | 10-2007-0117493 | 12/2007 |
| KR | 10-2012-0080924 | 7/2012 |
| WO | 2010017951 A1 | 2/2010 |

OTHER PUBLICATIONS

"Synonyms for engagement," Thesaurus.com, published Nov. 3, 2011, accessed Mar. 26, 2015, http://web.archive.org/web/20111103153220/http://thesaurus.com/browse/engagement.*

Coils and transformers, mikroe, Understanding Electronic Components, Published Nov. 5, 2010, Accessed Mar. 26, 2015, http://web.archive.org/web/20101105103749/http://www.mikroe.com/old/books/keu/03.htm.*

"Experiments with magnets and conductors: Copper Pipes," SCLINKS, Published Jan. 22, 2008, Accessed Online Jul. 23, 2015 https://web.archive.org/web/20080122132333/http://www.coolmagnetman.com/magpipes.htm.*

"Aluminum Interactions with Magnets," MXLO Pure Energy Systems, Published Mar. 7, 2004, Accessed Online Jul. 23, 2015, http://www.pureenergysystems.com/os/MagneticMotors/MXLO/theory/aluminum_and_mangets/index.html.*

* cited by examiner

AUTOMOTIVE INDUCTIVE CHARGER WITH INSERTABLE MAGNETIC CORE

CROSS-REFERENCE TO RELATED APPLICATION

This application claims under 35 U.S.C. §119(a) the benefit of Korean Patent Application No. 10-2012-0153679 filed Dec. 26, 2012, the entire contents of which are incorporated herein by reference.

BACKGROUND (a) Technical Field

The present invention relates to a magnetic connector apparatus that charges an electric vehicle that can charge a high-voltage battery of a plug-in hybrid vehicle or an electric vehicle.

(b) Background Art

Recently, there has been a growing public interest in plug-in hybrid electric vehicles or electric vehicles due to the rapid increase in oil price and environmental issues. The plug-in hybrid electric vehicles (PHEV) and the electric vehicles (EV) require a charging apparatus that charges electric energy into a large capacity of high-voltage battery. The charging apparatus supplies power necessary for the operation of various electronic components and a driving motor for driving a vehicle. The charging apparatus of an electric vehicle includes a charging station for the power supply and control and a connector that is detachably mounted in the inlet of the electric vehicle to supply electric energy to the inlet of the electric vehicle.

FIG. 1 is an exemplary view illustrating a typical electric vehicle charging apparatus. The electric vehicle charging apparatus includes a charger 102 disposed on the exterior of a vehicle, a connector 106, and an inlet 110 connected to a high-voltage battery 104 of the vehicle.

When the connector 106 of the charger 102 is plugged into the inlet of a vehicle and a protection circuit switch 108 is turned on, the battery charging of the high-voltage battery 104 is performed. The protection circuit switch 108 prevents the running of a vehicle during the battery charging. When the protection circuit switch 108 is turned on, the vehicle is prevented from running.

Moreover, FIG. 2 is an exemplary circuit view of a PHEV/EV charger using a power source. A typical connector is disposed between a power source 121 and a Power Factor Correction (PFC) 121 or between a converter 123 and a high-voltage battery 124, and is configured to maintain a contact, i.e., electric coupling between conductors.

However, since a contact resistance exists in a typical connector and a loss occurs due to the contact resistance, the overall efficiency of the charger may be reduced. Additionally, when the connector is not sufficiently connected, charging may be interrupted. Furthermore, although the contact surface and bonding strength of the connector may be increased to overcome the above limitations, this may cause the complexity of the connector structure and the increase of volume, making attachment and detachment of the connector difficult and reducing the reliability of the connector.

The above information disclosed in this Background section is only for enhancement of understanding of the background of the invention and therefore it may contain information that does not form the prior art that is already known in this country to a person of ordinary skill in the art.

SUMMARY

The present invention provides a magnetic connector apparatus that charges an electric vehicle, which can overcome limitations such as charging interruption due to contact failure of a typical connector, reduction of charging efficiency, and difficulty of attachment and detachment for maintaining electric coupling, by applying magnetic coupling caused by a magnetic core instead of a contact, i.e., electric coupling between typical conductors.

In one aspect, the present invention provides a magnetic connector apparatus that charges an electric vehicle through contactless magnetic coupling, comprising: an external charger; an inlet connected to a rechargeable battery of the vehicle; and a magnetic connector connected to a power source of the external charger and transferred to the vehicle to be inserted into the inlet.

In an exemplary embodiment, the magnetic connector may use a transformer of a converter as a connector.

In another exemplary embodiment, the magnetic connector may include: a primary wire extending from the external charger and including a first coil part; a secondary wire disposed on the inlet of the vehicle and including a second coil part; a magnetic core part magnetically connecting between the primary wire and the secondary wire.

In still another exemplary embodiment, the magnetic core part may be passed through and inserted into the first coil part of the primary wire, and may be inserted into the second coil part of the secondary wire by moving the magnetic core part to the vehicle upon charging of the rechargeable battery of the vehicle.

In yet another exemplary embodiment, the magnetic core part may be passed through and inserted into the second coil part of the secondary wire, and upon charging of the rechargeable battery of the vehicle, the primary wire may be moved to the vehicle and the magnetic core part may be passed through and inserted into the first coil part of the primary wire.

In still yet another exemplary embodiment, the magnetic core part may have a C-shape to connect the primary wire and the secondary wire.

In a further exemplary embodiment, the magnetic core part may include a C-shaped ring part and a folding part coupled to both ends of the ring part to be spread and folded by a hinge structure.

In another further exemplary embodiment, the magnetic core part may include a magnetic core having a magnetic property therein and an insulation cover that covers the magnetic core.

In still another further exemplary embodiment, the magnetic connector may include: a case housing a switch of a converter; a primary wire connected to the switch of the case; a magnetic core part magnetically coupled to the primary wire and having one end portion thereof coupled to the case by a hinge structure and the other end portion thereof protruding from the case to be spread and folded; and a release button part pushably mounted on the case and allowing the magnetic core part to be spread.

In yet another further exemplary embodiment, the release button part may be elastically supported by a spring in a rotation direction, and the magnetic core part may be spread when the release button part is pushed and may be restored to an original position when the release button part is released.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
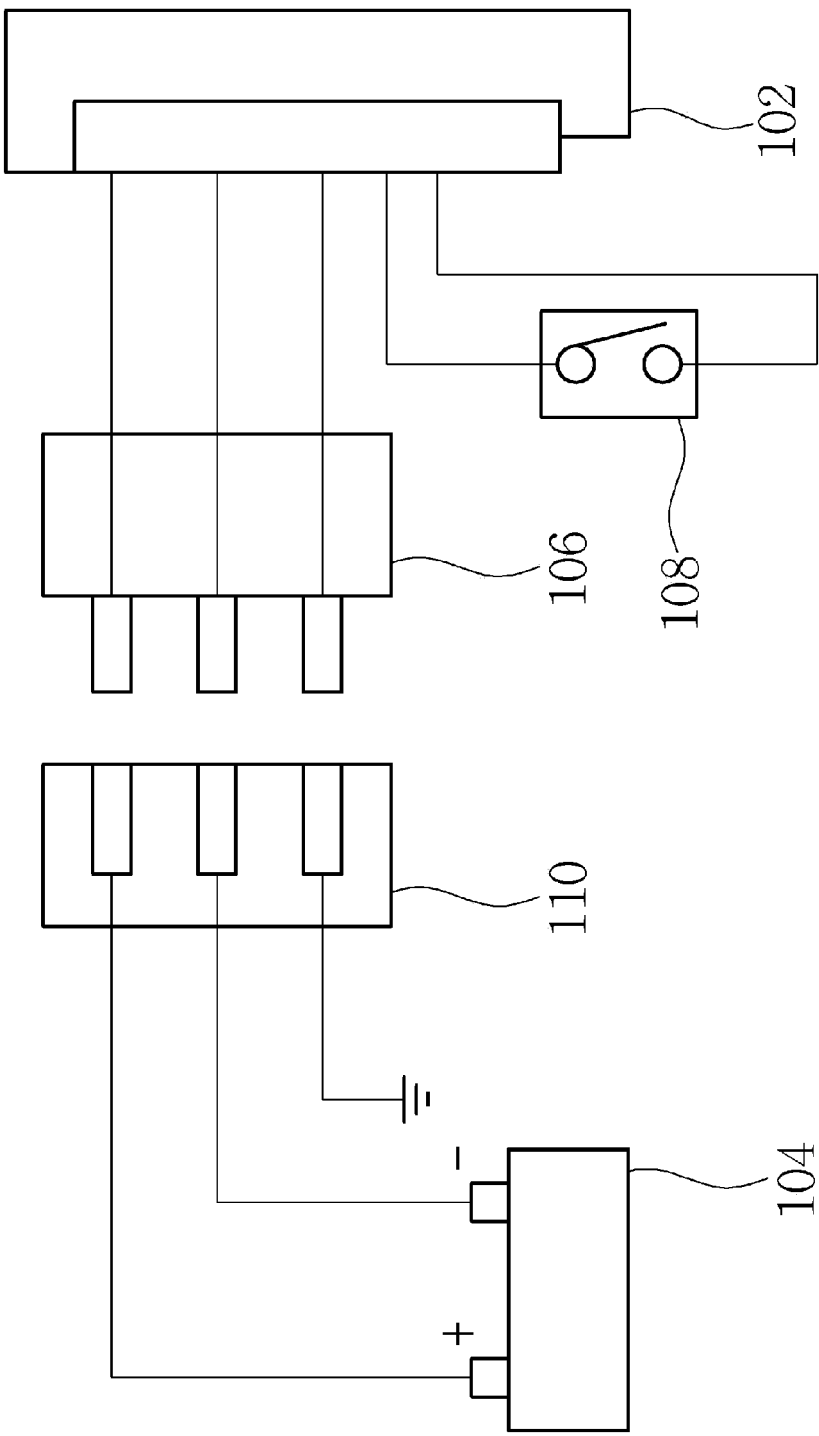
FIG. 1 is an exemplary view illustrating a typical electric vehicle charging apparatus according to the related art.

Reference numerals set forth in the Drawings includes reference to the following elements as further discussed below:

| | |
|---|---|
| 10: case | 11: primary wire |
| 12: magnetic substance | 13: insulation cover |
| 14: magnetic substance part | 15: release button part |
| 20: external charger | 21: primary wire |
| 22: ring part | 23: fording part |
| 24, 24': magnetic substance part | 25: secondary wire |
| 26: vehicle | 27: bobbin |
| 28: magnetic connector | |

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the accompanying claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Hereinafter, exemplary embodiments of the present invention will be described in detail with reference to the accompanying drawings so that those skilled in the art can easily carry out the present invention.

Figure 3:
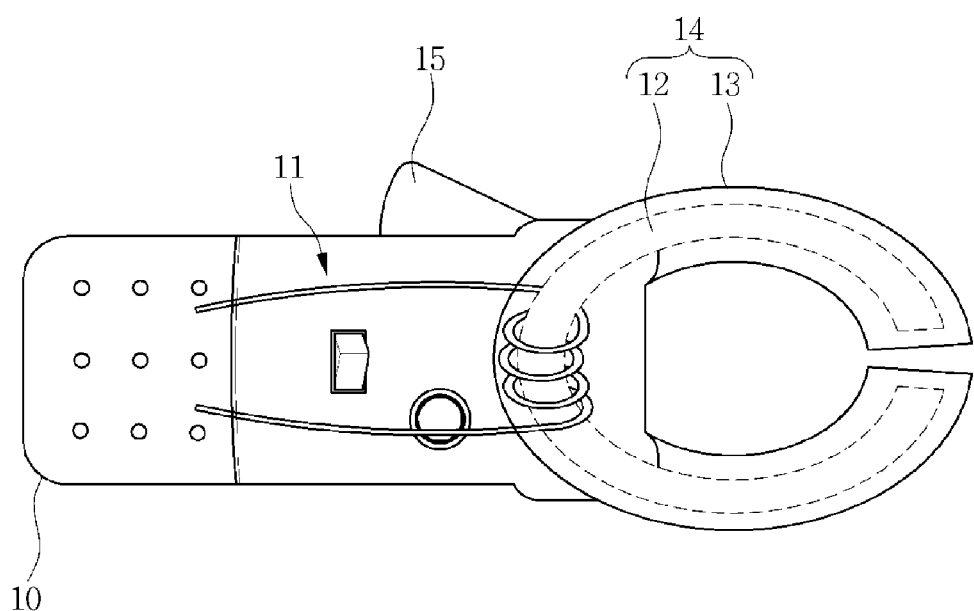
FIG. 3 is an exemplary view illustrating a connector outlet according to an exemplary embodiment of the present invention.
Figure 4A:
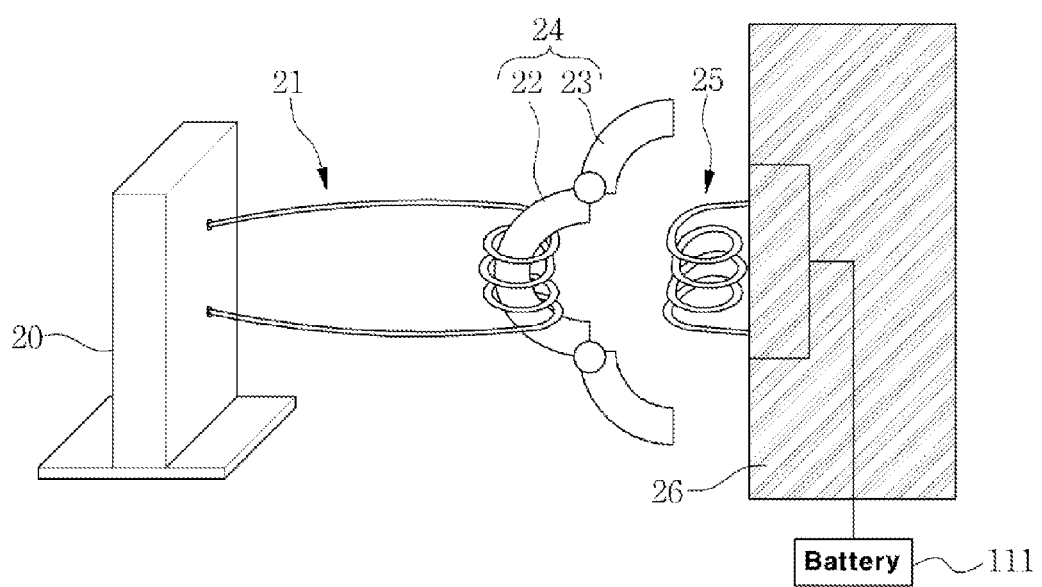
FIGS. 4A and 4B are exemplary views illustrating a magnetic connector apparatus that charges an electric vehicle according to an exemplary embodiment of the present invention.
Figure 4B:
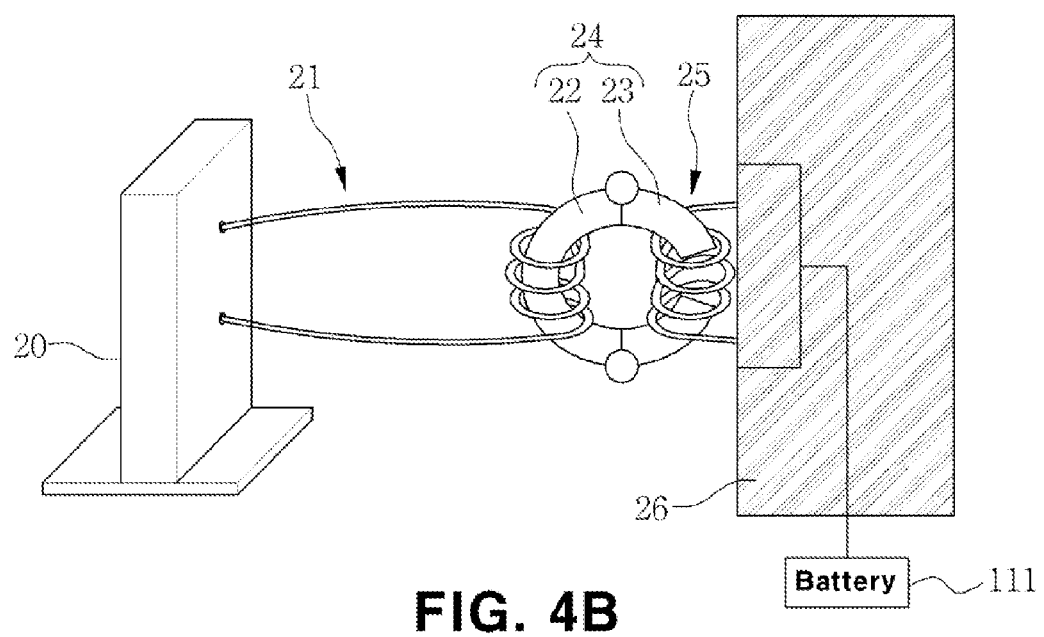

FIG. 3 is an exemplary view illustrating a connector outlet according to an exemplary embodiment of the present invention. FIGS. 4A and 4B are exemplary views illustrating a magnetic connector apparatus that charges an electric vehicle according to a first exemplary embodiment of the present invention.

The present invention relates to a new type of magnetic connector apparatus that charges a high-voltage battery of a PHEV or EV vehicle 26. The magnetic connector apparatus may be applied to electric vehicles or plug-in hybrid vehicles. The electric vehicles mentioned in this disclosure should be construed as including plug-in hybrid vehicles.

Figure 2:
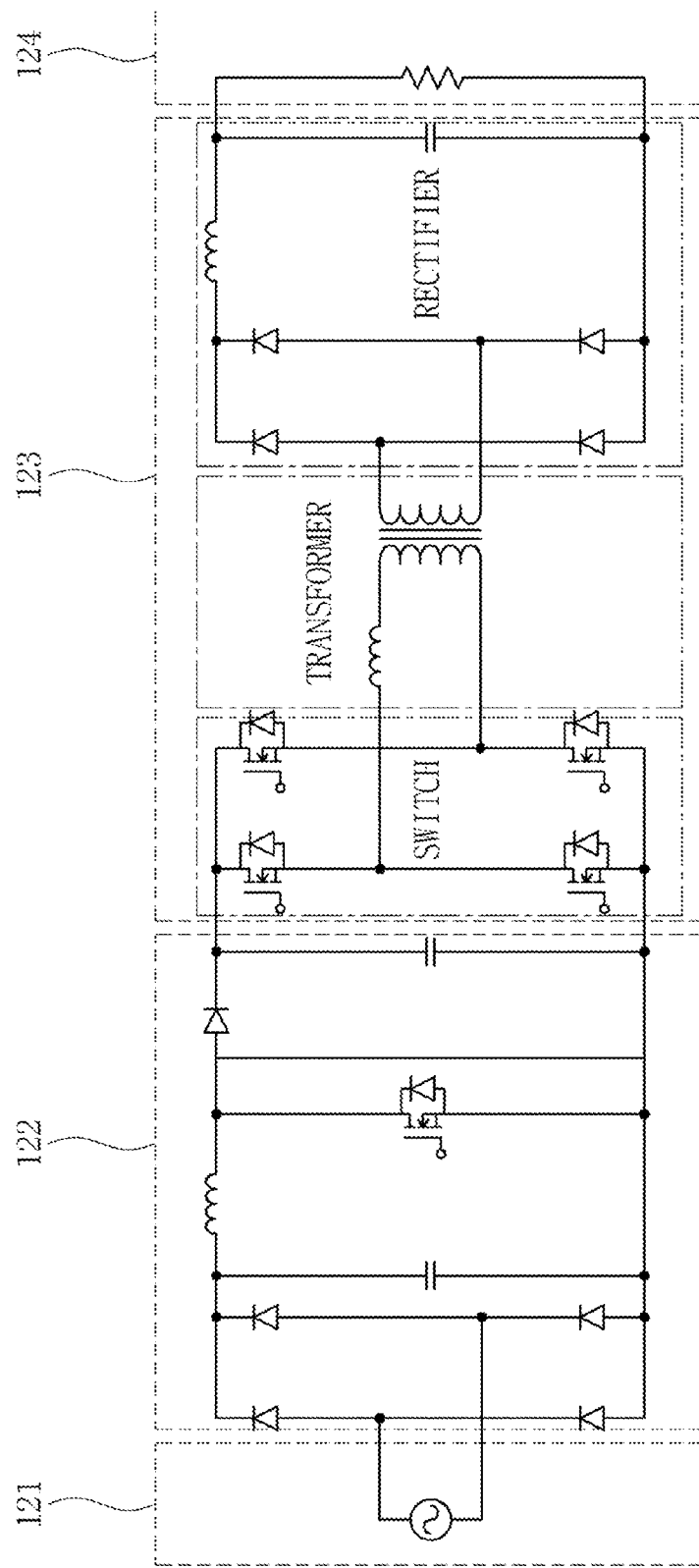
FIG. 2 is an exemplary circuit view illustrating a PHEV/EV charger using a normal power source according to the related art.

A magnetic connector 28 according to an exemplary embodiment of the present invention may use a transformer of a converter 123 of FIG. 2 as a connector. The magnetic connector apparatus according to this embodiment, as shown in FIGS. 4A and 4B, may include a primary wire 21 connected to a switch of an external charger 20, a magnetic core part 24 wrapped by an insulation cover and partially separated, and a secondary wire 25 connected to a rectifier.

The external charger 20 may include the power source 121 shown in FIG. 2, a power supply 121, a Power Factor Correction (PFC) 122, and a switch of a converter 123 like in FIG. 2. In particular, the outlet of the connector may include primary wires 11 and 21 extending from the external charger 20 and a magnetic substance part 24, and the inlet of the connector may be equipped in a vehicle 26, and may include a secondary wire 25 connected to a rechargeable battery 111.

Hereinafter, the structure of a connector outlet according to an exemplary embodiment of the present invention will be described in detail.

As shown in FIG. 3, the connector outlet may include a case 10, a primary wire 11 equipped within the case, and a magnetic core part 14 protruding from the case 10. The case 10 may include the switch of the converter mounted therein and the primary wire 11 connected to the switch. The magnetic core part 14 may include a magnetic core 12 having a magnetic property similar to a magnet, and an insulation cover 13 that insulates the magnetic core 12 from the exterior.

The magnetic core part 14 may have an opening at one side thereof similar to a C-shaped ring. In particular, the closing part of the C-shape ring may be separated into a first magnetic core part and a second magnetic core part. The first and second magnetic core parts may be connected by a hinge structure such that the opening may be folded or unfolded. A hinge part (e.g., connection part) or a part of the first magnetic core part and the second magnetic core part may be inserted into the case 10, and the other part thereof may protrude from the case 10.

A release button part 15 may be pushably disposed on one side surface of the case 10, and may be connected to the first and second magnetic core parts. When the release button part 15 is pushed in the lateral direction, the first and second magnetic core parts may spread, and the release button part 15 may be elastically supported by a spring in the rotation direction. In particular, when the release button part 15 is released, the first and second magnetic core parts may be restored to an original position, allowing the first and second magnetic core parts to be retracted and contacted with each other.

The outlet of the connector may be extended according to a distance from the external charger 20. The coupling of the magnetic connector apparatus may be performed by moving the outlet of the magnetic connector apparatus to the vehicle 26 to insert the outlet into the inlet 110 of the vehicle 26 and passing the magnetic core part 14 through the secondary wire 25 of the inlet for magnetic coupling between the primary wire 11 and the secondary wire 25. Specifically, the magnetic connector apparatus may be implemented in various embodiments.

Figure 5A:
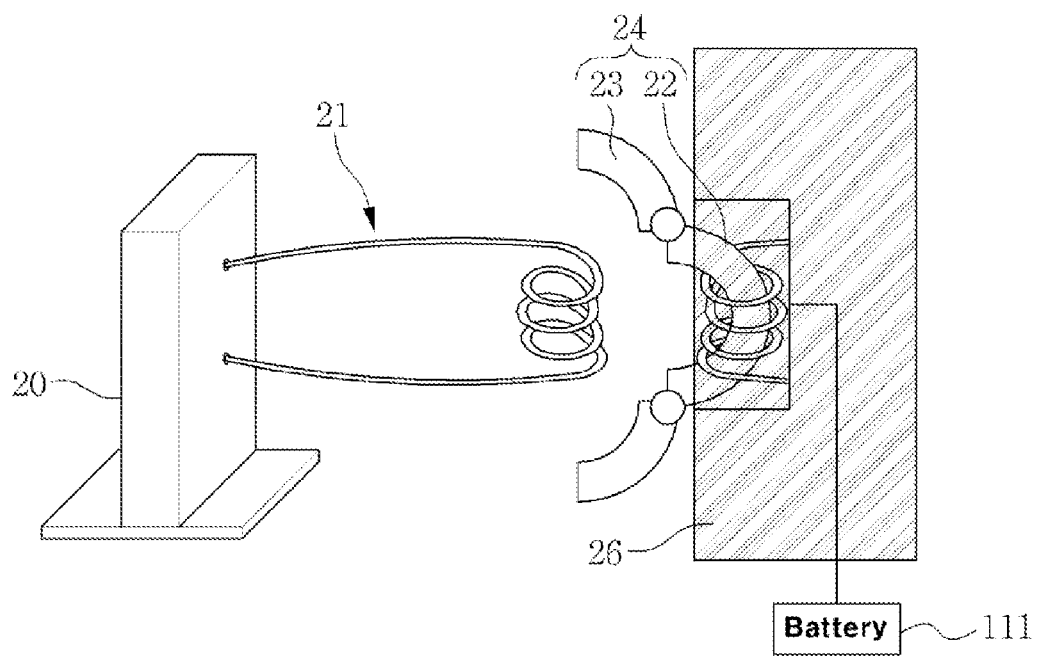
FIGS. 5A and 5B are exemplary views illustrating a magnetic connector apparatus that charges an electric vehicle according to another exemplary embodiment of the present invention.
Figure 5B:
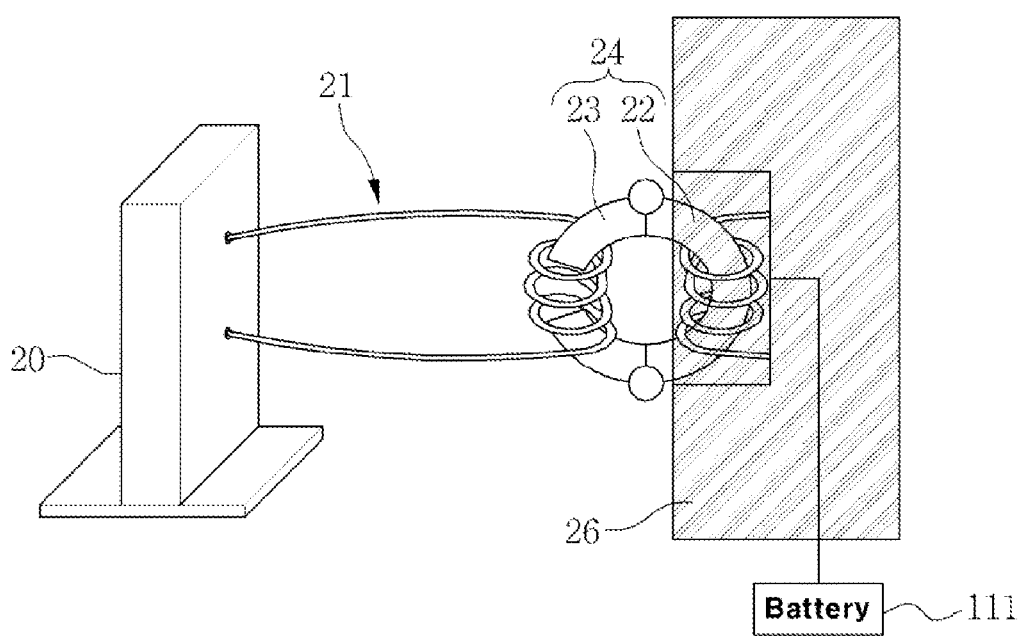
Figure 6A:
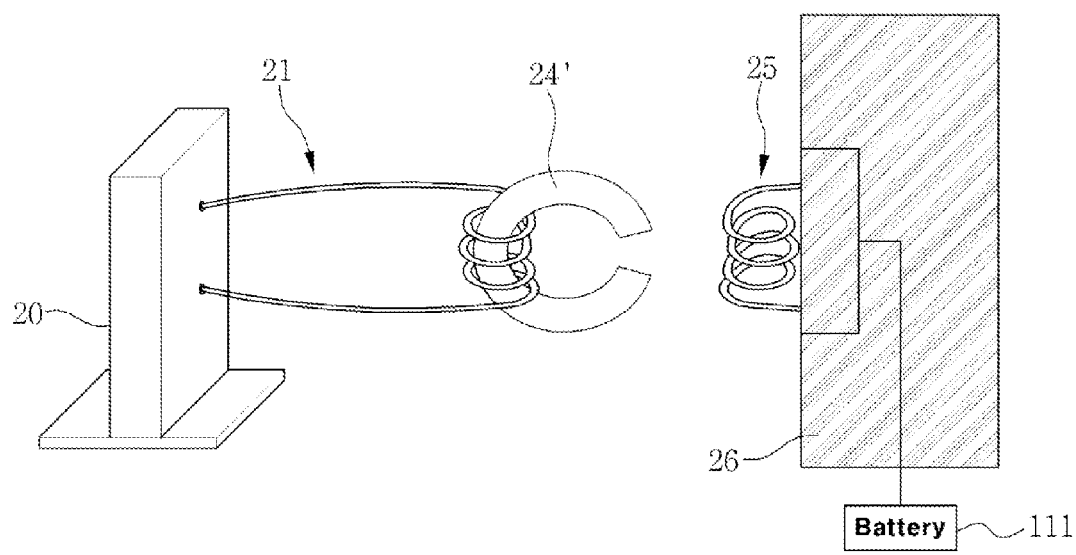
FIGS. 6A and 6B are exemplary views illustrating a magnetic connector apparatus that charges an electric vehicle according to another exemplary embodiment of the present invention.
Figure 6B:
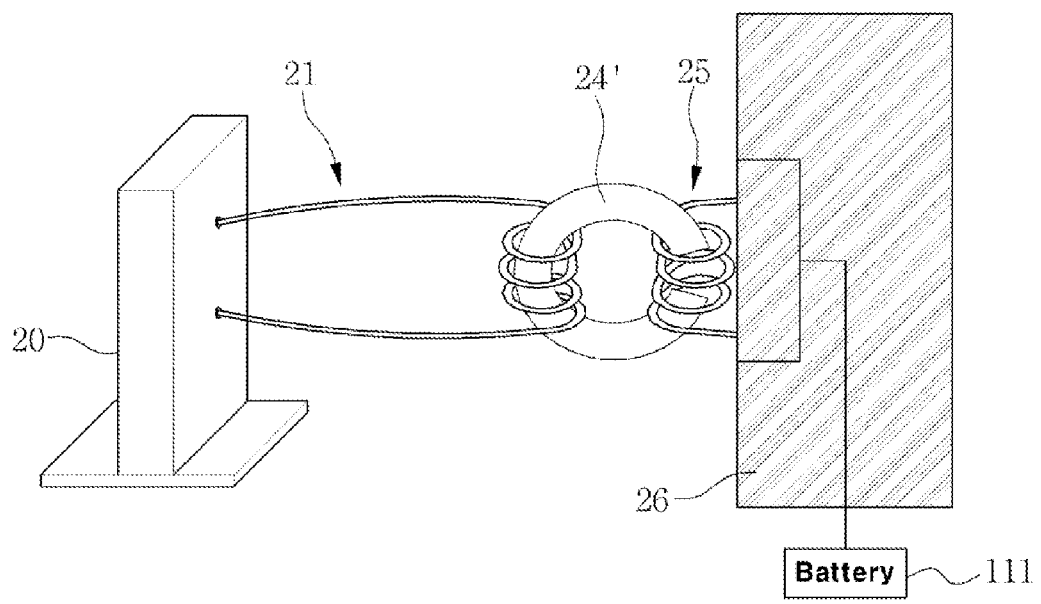
Figure 7:
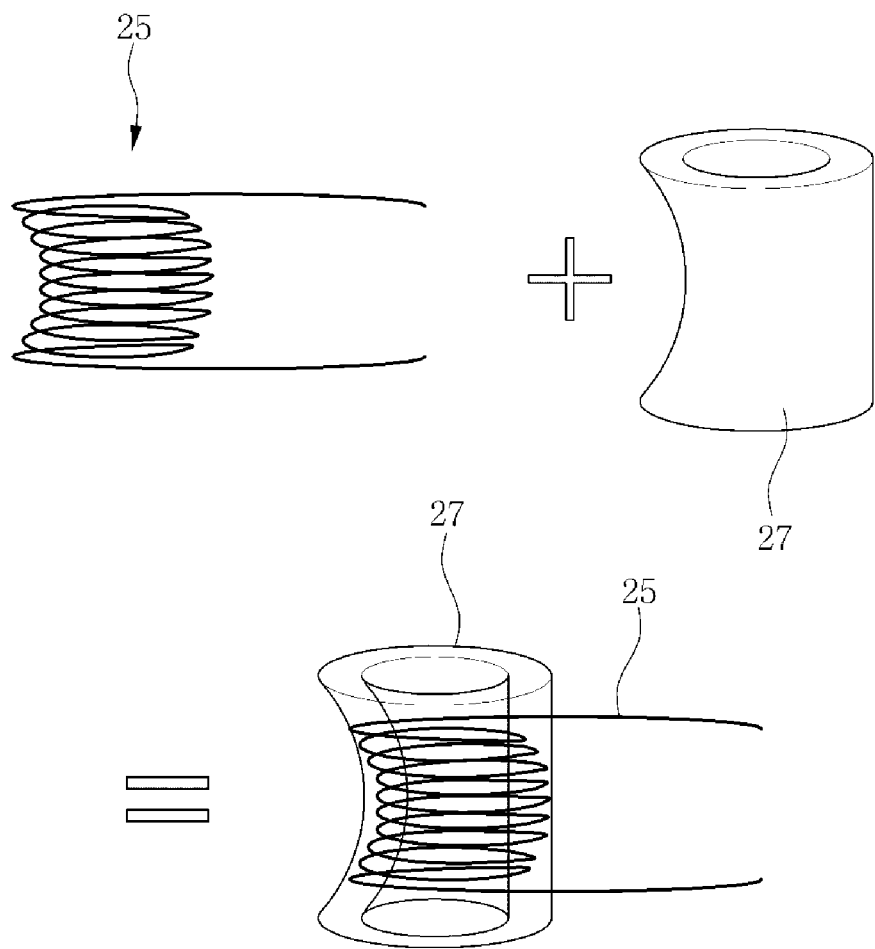
FIG. 7 is an exemplary view illustrating a second coil and a bobbin structure according to an exemplary embodiment of the present invention.

FIGS. 5A and 5B are exemplary views illustrating a magnetic connector apparatus that charges an electric vehicle according to a second exemplary embodiment of the present invention. FIGS. 6A and 6B are exemplary views illustrating a magnetic connector apparatus that charges an electric vehicle according to a third exemplary embodiment of the present invention. FIG. 7 is an exemplary view illustrating a second coil and a bobbin structure according to an exemplary embodiment of the present invention.

For example, as shown in FIGS. 4A and 4B, the magnetic core part 24 of the connector outlet may include a C-shaped ring part 22 and a folding part 23 having a magnetic property. The ring part 22 may pass through a coil of the primary wire 21 extending from the external charger 20 to be connected to the primary wire 21. The folding part 23 may be connected to the ring part 22 by a hinge structure at both end portion of the ring part 22 while spreading and folding. Thus, when the connector outlet moves toward the vehicle 26 to charge the battery, the magnetic core part 24 may be folded by the hinge structure, allowing both end portions of the magnetic core part 24 on the side of the primary wire 21 to pass through the coil of the secondary wire 25.

According to another exemplary embodiment of FIGS. 5A and 5B, the magnetic core part 24 may be connected to the secondary wire 25 of the inlet 110 of the vehicle 26.

According to another exemplary embodiment of FIGS. 6A and 6B, a magnetic core part 24' may be connected to the coil of the primary wire 21 extending from the external charger 20, but may be formed in an integral type instead of a separate type in which the both sides of the magnetic core part 24' are combined and rotated by a hinge structure (see FIGS. 4A and 4B) or C-shaped structure is separated into two pieces. In other words, a magnetic connector 28 having a simple structure may be implemented with the integral hook-type magnetic core part 24'.

The hook-type magnetic core part 24' may have a C- or U-shape, and the both end portions thereof may be inserted into the coil of the secondary wire 25. In particular, the coil of the secondary wire 25 may have a sufficient diameter to allow the end portion of the hook-type magnetic core part 24' to be hooked therein and may have a height larger than a gap between both end portions of the hook-type magnetic core part 24' to allow both end portions of the hook-type magnetic core part 24' to be inserted into the coil of the secondary wire 25.

Regarding a magnetic coupling between the hook-type magnetic core part 24' and the secondary wire 25, one end portion of the hook-type magnetic core part 24' may be first inserted into and hooked in the coil of the secondary wire 25, and then the other end portion of the hook-type magnetic core part 24' may be inserted into the opposite side of the coil of the secondary wire 25.

In FIG. 7, the top and the bottom of the coil of the secondary wire 25 may gradually protrude compared to the middle thereof, and the middle of the coil of the secondary wire 25 may be hollowed to form a concave shape, allowing the magnetic core part to smoothly pass through the coil of the secondary wire 25. Additionally, a molding bobbin 27 may be provided to protect the coil of the secondary wire 25. The molding bobbin 27 may house the coil of the secondary wire 25, and may be filled with molding resin to seal the coil of the secondary wire 25 from the exterior.

Accordingly, the present invention has the following advantages compared to a related-art.

First, a loss occurs in a typical contact-type connector structure due to a contact resistance according to the contact condition, but the contact resistance does not exist in the magnetic connector 28 according to the exemplary embodiment of the present invention.

Second, charging may be interrupted when the contact failure occurs due to an impact in a typical contact-type connector structure, but the magnetic connector 28 according to the exemplary embodiment of the present invention includes a magnetic core passing through the secondary wire 25. Accordingly, the contact failure may not occur, and charging may not be affected even when a crack occurs on the magnetic core due to an impact.

Third, a typical connector may be strengthened in coupling force to enhance the maintenance of contact during charging and the enhanced coupling force may complicate the structure of the connector and may make the attachment and detachment of the connector difficult, but the magnetic connector 28 according to the exemplary embodiment of the present invention may be easily used by passing the magnetic core through the secondary wire 25.

Fourth, a converter that may perform Zero-Voltage Switching (ZVS) may be used to reduce the loss of the switch. To implement of ZVS, an additional inductance may be needed on a transformer. However, when the magnetic connector 28 according to the exemplary embodiment of the present invention is used, the length of the primary wire 21 may be elongated, forming inductance without an additional inductance.

The invention has been described in detail with reference to exemplary embodiments thereof. However, it will be appreciated by those skilled in the art that changes may be made in these embodiments without departing from the principles and spirit of the invention, the scope of which is defined in the accompanying claims and their equivalent.

What is claimed is:

1. A magnetic connector apparatus that charges a vehicle through contactless magnetic coupling, comprising:
   an external charger;
   an inlet connected to a rechargeable battery of the vehicle; and
   a magnetic connector connected to a power source of the external charger and transferred to the vehicle to be inserted into the inlet,
   wherein the magnetic connector comprises:
   a primary wire that extends from the external charger and includes a coil part;
   a secondary wire disposed on the inlet of the vehicle and includes a coil part;
   a magnetic core part that magnetically connects between the primary wire and the secondary wire,
   wherein the magnetic core part is connected to the coil part of the primary wire or the coil part of the second wire,
   wherein the magnetic core part includes a C-shaped ring part and a folding part coupled to both ends of the ring part to be spread and folded by a hinge structure,
   wherein the magnetic core part is passed through and inserted into the coil part of the primary wire, and is inserted into the coil part of the secondary wire by moving the magnetic core part toward the vehicle upon charging of the rechargeable battery of the vehicle, wherein the both ends of the ring part are coupled when the magnetic core part is passed through and inserted into the coil part of the primary wire.

2. The magnetic connector apparatus of claim 1, wherein the magnetic connector uses a transformer of a converter as a connector.

3. The magnetic connector apparatus of claim 1, wherein the magnetic core part is passed through and inserted into the coil part of the secondary wire, and upon charging of the rechargeable battery of the vehicle, the primary wire is moved toward the vehicle and then the magnetic core part is passed through and inserted into the coil part of the primary wire.

4. The magnetic connector apparatus of claim 1, wherein the magnetic core part has a C-shape to connect the primary wire and the secondary wire.

5. The magnetic connector apparatus of claim 1, wherein the magnetic core part includes a magnetic core having a magnetic property therein and an insulation cover that covers the magnetic core.

6. The magnetic connector apparatus of claim 1, wherein the magnetic connector apparatus is applied to electric vehicles or hybrid vehicles.

7. The magnetic connector apparatus of claim 1, wherein the magnetic connector comprises:
- a case that houses a switch of a converter;
- a primary wire connected to the switch of the case;
- a magnetic core part magnetically coupled to the primary wire and having one end portion thereof coupled to the case by a hinge structure and the other end portion thereof protruding from the case to be spread and folded; and
- a release button part pushably mounted on the case and allowing the magnetic core part to be spread.

8. The magnetic connector apparatus of claim 7, wherein the release button part is elastically supported by a spring in a rotation direction, and the magnetic core part is spread when the release button part is pushed and is restored to an original position when the release button part is released.

9. A magnetic connector apparatus that charges a vehicle through contactless magnetic coupling, comprising;
- an external charger; and
- an inlet connected to a rechargeable battery of the vehicle; and
- a magnetic connector that includes;
- a primary wire that extends from the external charger and includes a coil part;
- a secondary wire disposed on the inlet of the vehicle and includes a coil part;
- a magnetic core part that magnetically connects between the primary wire and the secondary wire,
- wherein the magnetic core part includes a C-shaped ring part and a folding part coupled to both ends of the ring part to be spread and folded by a hinge structure,
- wherein the magnetic core part is passed through and inserted into the coil part of the primary wire, and is inserted into the coil part of the secondary wire by moving the magnetic core part toward the vehicle upon charging of the rechargeable battery of the vehicle,
- wherein the both ends of the ring part are coupled when the magnetic core part is passed through and inserted into the coil part of the primary wire.

10. The magnetic connector apparatus of claim 9, wherein the magnetic connector apparatus is applied to electric vehicles or hybrid vehicles.

* * * * *